Figure 1:
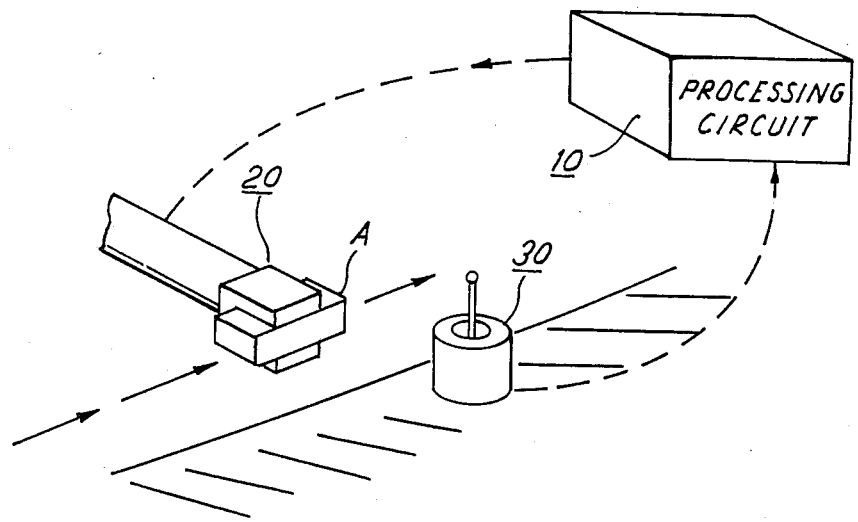

United States Patent [19]
Ashton et al.

[11] Patent Number: 4,687,979
[45] Date of Patent: Aug. 18, 1987

[54] CONTROL SYSTEM FOR A ROBOTIC GRIPPER

[75] Inventors: Mark Ashton, Harrow; Godfrey N. Hounsfield, Twickenham, both of England

[73] Assignee: EMI Limited, Hayes, England

[21] Appl. No.: 817,582

[22] Filed: Jan. 10, 1986

[30] Foreign Application Priority Data

Jan. 17, 1985 [GB] United Kingdom ............... 8501178

[51] Int. Cl.<sup>4</sup> ........................................... G05B 1/06
[52] U.S. Cl. .................................. 318/638; 318/568; 33/557
[58] Field of Search .................. 318/638, 568, 568 D; 33/557

[56] References Cited

U.S. PATENT DOCUMENTS 4,455,754  6/1986  Benjamin ........................... 33/557

FOREIGN PATENT DOCUMENTS 0068899  5/1983  European Pat. Off. .
1369164  10/1974  United Kingdom .
1461316  1/1977  United Kingdom .
1586052  3/1981  United Kingdom .
1589297  5/1981  United Kingdom .
2136962  10/1983  United Kingdom .
2141546  4/1984  United Kingdom .

*Primary Examiner*—William M. Shoop, Jr.
*Assistant Examiner*—Saul M. Bergmann
*Attorney, Agent, or Firm*—Fleit, Jacobson, Cohn & Price

[57] ABSTRACT

In a control system for a robotic gripper a processing circuit (10) controls movement of the gripper (20) on a prearranged path. An article (A) held by gripper (20) comes into contact with the probe member (32) of a "known-down" sensor (30). A support assembly (33), on which the probe member (32) is mounted, is displaced with respect to a base member (31) allowing a continuous, uninhibited movement of the gripper along the path, even after contact has been established. In an alternative arrangement the sensor is mounted on the gripper and establishes contact with an article located at a fixed work station.

5 Claims, 7 Drawing Figures

CONTROL SYSTEM FOR A ROBOTIC GRIPPER

This invention relates to a control system for a robotic gripper and it relates also to a sensing device for use in such a system.

In an automatic assembly and/or processing system a robotic gripper is often employed to convey an article, e.g. a workpiece or tool, from one prearranged work station to another. The article should be presented at the intended station with a required degree of precision and, to this end, it is usually desirable to assess if the article is being held in the gripper correctly.

A known system includes a processor conditioned to control movement of the gripper on a desired, pre-planned path. To assess if an article is being held correctly, the path is so designed that the article contacts a sensor fixed at a known position. Conventionally the sensor output is monitored continually and the gripper halted when contact is detected. The position of the gripper is then evaluated and, if necessary, a suitable correction applied to the path to take account of any discrepancy between the actual and expected positions of the gripper.

This technique tends to be rather unsatisfactory in that the gripper is subject to delay, reducing the efficiency of associated processing and/or assembly operations.

Delay may also be encountered if the sensor is mounted on the gripper itself and used to evaluate the position of an article which is fixed in relation to a work surface and relative to which the gripper, and so the sensor, can move.

It is an object of the present invention to provide a control system in which the above-described problems are at least alleviated.

According to one aspect of the invention there is provided a control system for a robotic gripper, the control system including a processing circuit for controlling movement of the gripper on a prearranged path so as to establish, at a position intermediate the ends of said path, contact between a sensor mounted on the gripper, or at a reference position, and an article respectively located at a workstation, or carried by the gripper, the sensor being arranged to generate an electrical signal in response to a said contact being established and said electrical signal being utilised by the processing circuit to evaluate the position of the article with respect to said reference position or the gripper, the sensor including a probe member displaceable with respect to a base portion of the sensor so as to allow a substantially continuous, uninhibited movement of the gripper on said path, beyond said intermediate position, even after a said contact has been established.

With a control system in accordance with the present invention data may be evaluated while the gripper is in motion. "On-the-fly" measurement of this kind leads to faster accumulation of data and more efficient planning of gripper movement than would otherwise the case.

The sensor may, in effect, have a "knock-down" construction wherein the probe member is mounted on a support member, itself displaceable with respect to a base.

Figure 3:
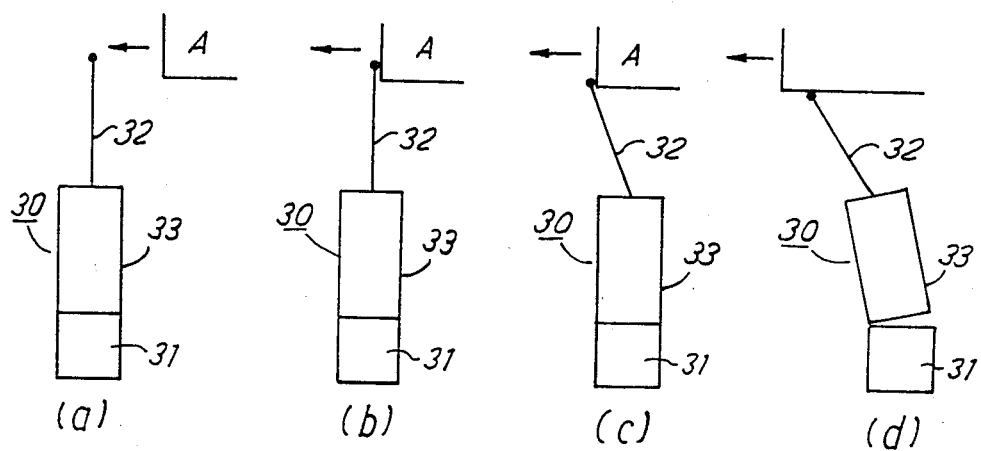
Figure 2:
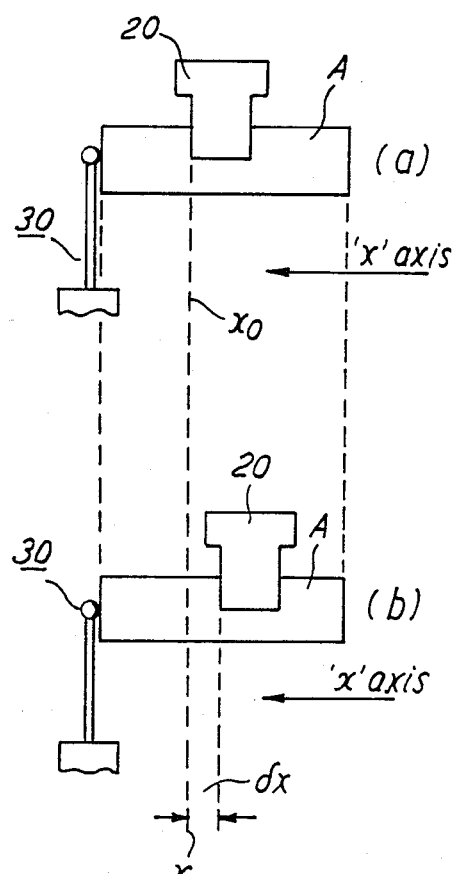
Figure 4:
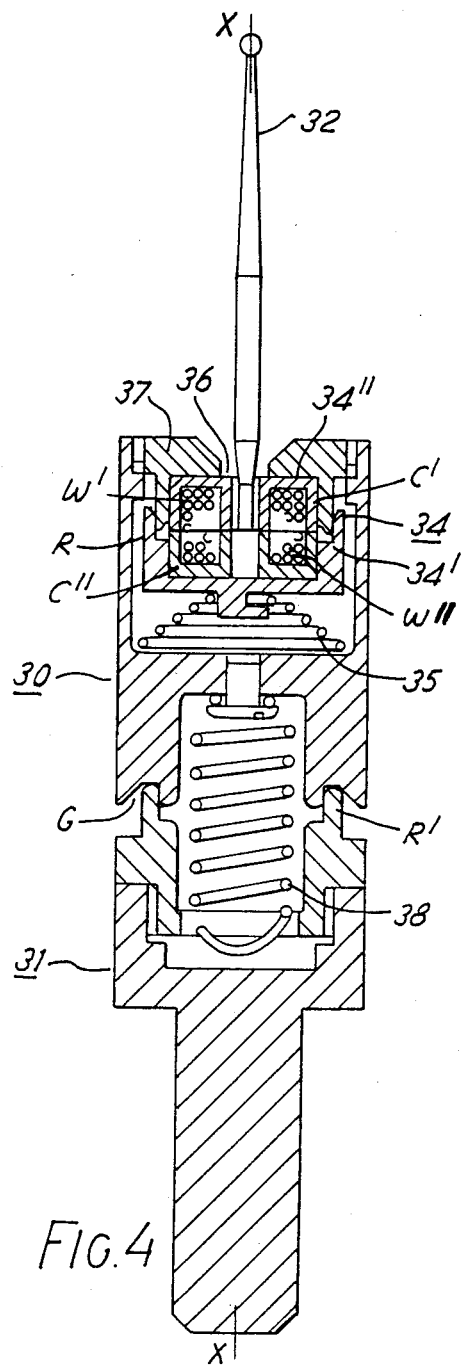

In order that the invention may be carried readily into effect an embodiment thereof is now described, by way of example only, by reference to, and as illustrated in, the accompanying drawings of which, FIG. 1 shows, in schematic form, a system for controlling a robotic gripper, FIG. 2 shows a simplified example of the system shown in FIG. 1, FIGS. 3a to 3d show a sensing device in different operational configurations, and FIG. 4, shows a detailed sectional view on a longitudinal axis of the sensing device.

The control system of FIG. 1 includes a processing circuit, shown generally at 10, conditioned to control movement of a robotic gripper 20 on a prearranged path. To assess if an article, represented at A, is being gripped correctly a sensing device 30 is provided to contact the article at a known position on the path. When contact is established, the sensing device generates an electrical pulse which is routed to the processing circuit.

In general, the processing circuit will have been supplied with data relating to the size and/or shape of the article to be gripped and to its intended position and/or orientation in the gripper, and with this data the processing circuit can evaluate the expected position of the gripper at the instant of contact. This evaluation is, of course, based on the assumption that the article is being gripped correctly. The extent of any discrepancy between the actual and expected positions can be evaluated by the processor which may then effect a suitable modification in the path to compensate for misalignment and/or mis-orientation of the article in the gripper.

FIG. 2 illustrates, schematically a simplified example, in which a gripper 20 moves in one direction only (in the x-axis direction) and the article A, which is rectangular in cross-section, is intended to be gripped centrally, as shown in FIG. 2a. In these circumstances, the gripper assumes an expected position $x_o$ when the leading face of the article contacts sensor 30. If, however, the article is held incorrectly, as shown in FIG. 2b, the gripper assumes an actual position $x_o-\delta x$ and the processor must take corrective action by shortening the original path by an amount $\delta x$, the extent of the misalignment of the object in the gripper. It will be appreciated that if the article has an irregular or complex shape the gripper may need to approach the sensor device in a number of different directions to assess the precise nature and extent of any misalignment and/or mis-orientation.

As shown in FIGS. 3 and 4, the sensing device is so contructed as to allow substantially uninterrupted movement of the gripper, even when contact with an article, held by the gripper, has been established.

The device has three main parts, namely a base 31, a rod-like probe 32 and a support assembly 33 on which the probe is mounted. These parts assume a normally stable configuration, each centred on, and having cylindrical symmetry about, a common, longitudinal axis XX of the device. However, to accommodate movement of the gripper both the probe and its support are individually displaceable with respect to the axis.

On first contact with an object, the situation illustrated in FIG. 3b, the probe is displaced in relation to the support assembly and a displacement sensor, described in greater detail hereinafter, responds instantaneously to indicate that contact has been detected. The probe is capable of undergoing only limited displacement with respect to the support assembly and eventually comes hard up against a stop, as shown in FIG. 3c. Thereafter, the support assembly itself is displaced with respect to the base, as demonstrated in FIG. 3d. Thus the device has, in effect, a "knock-down" construction.

Referring to FIG. 4, the probe is anchored securely to a lower part 34' of a bush 34. An upper part 34" of the bush is fixed to the body of the support assembly and has a rim R defining, in effect, a pivot on which the lower part of the bush can rock thereby to accommodate angular displacement of the probe with respect to the support assembly.

A compression spring 35 is arranged to act on the lower part of the bush and tends to maintain the probe in its stable position, as shown, and to restore the probe to that position, with precision, after it has been displaced.

In this example, the bush also houses a displacement sensor 36 comprising a pair of windings W', W" formed on respective ferrite cores C', C" mounted in the upper and lower parts of the bush. A slight displacement of the probe, occasioned by contact with an article, introduces an air gap between the cores sufficient to produce a detectable change in the mutual inductance of the coils. Typically, one of the coils is fed with a suitable a.c. signal and a response signal is detected across the leads of the other.

It will be appreciated that an alternative form of sensor suitable for detecting contact with an article could be employed e.g. a sensor utilising an optical, capacitive, magnetic or piezo-electric technique.

A flange 37 on the upper part of the bush defines a stop which limits displacement of the probe, with respect to the support assembly. Continued displacement of the probe with respect to the longitudinal axis XX of the device can still be achieved, however, by displacement of the support assembly itself with respect to the base. To this end a groove G formed in the lower edge of the support assembly locates in an upstanding rim R' of the base which acts as a pivot. The base and support assembly are coupled together resiliently by means of a coil spring 38, and suitably shaped formations on the lower edge ensure that the support assembly is held in contact with the base during displacement. As in the case of spring 35, spring 38 tends to hold the support assembly in the stable position, as shown in FIG. 4, and to restore the assembly to that position, with precision, after it has been displaced.

It will be appreciated that a sensing device of the kind described herein by reference to FIGS. 3 and 4 is particularly beneficial when used in a system of the kind described by reference to FIG. 1. A sensing device having a "knock-down" construction of the described kind permits uninhibited movement of the gripper; thus "on-the-fly" measurements can be made resulting in a faster accumulation of data and faster manipulator speeds than would otherwise be possible. The sensing device is especially advantageous in an application wherein a robotic gripper must approach the sensor in a number of different directions thereby to accumulate sufficient data to assess the position and/or orientation of a complex object in relation to the gripper; in these circumstances more efficient planning of the gripper movement can be achieved.

In another example of the invention, a "knock-down" sensor of the kind described hereinbefore is mounted on the gripper itself and used to evaluate the position and/or orientation of an article relative to which the gripper, and so the sensor, can move. The article may, for example, be held in a vice mounted on a work surface. The gripper may be caused to move on a path so as to contact the article to evaluate, without ambiguity its position and/or orientation in relation to the gripper. The sensor may be used, for example, to contact a distinctive feature of the article.

We claim:

1. A control system for a robotic gripper, the control system including
a processing circuit for controlling movement of the gripper on a prearranged path to establish, at a position intermediate the ends of said path, contact between a contact sensor mounted on the gripper, or at a reference position, and an article located at a workstation, or carried by the gripper respectively,
the sensor being arranged to generate an electrical signal in response to a said contact being established and said electrical signal being utilised by the processing circuit to evaluate the position of the article with respect to said reference position or the gripper, the sensor including a probe member displaceable with respect to a base portion of the sensor thereby to allow substantially continuous, uninhibited movement of the gripper on said path, beyond the intermediate position, and allowing said sensor and article to become disengaged.

2. A control system according to claim 1 wherein said probe member is mounted on a support assembly, displaceable with respect to said base portion, and means resiliently coupling the support assembly and the base portion to return the probe member, when displaced, towards a stable position.

3. A control system according to claim 2 wherein said probe member is also temporarily displaceable with respect to the support assembly and is provided with detection means responsive to an initial displacement of the probe member, with respect to the support assembly due to contact being established, to generate a said electrical signal.

4. A system according to claim 3 wherein said support assembly, base portion and probe member are so arranged with respect to one another that displacement of the support assembly with respect to the base portion can only occur provided the probe member is first displaced, by a preset amount, with respect to the support assembly.

5. A control system according to claim 1 wherein said processing circuit is conditioned to modify said path in dependence on a said evaluation of the position of the article with respect to said reference position or the gripper.

* * * * *